United States Patent
Taguchi et al.

(10) Patent No.: US 9,577,715 B2
(45) Date of Patent: *Feb. 21, 2017

(54) RESONANCE-TYPE NON-CONTACT POWER SUPPLY SYSTEM

(75) Inventors: Yuichi Taguchi, Kariya (JP); Atsushi Yamaguchi, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 578 days.

This patent is subject to a terminal disclaimer.

(21) Appl. No.: 14/125,795

(22) PCT Filed: May 11, 2012

(86) PCT No.: PCT/JP2012/062180
§ 371 (c)(1),
(2), (4) Date: Mar. 13, 2014

(87) PCT Pub. No.: WO2012/172900
PCT Pub. Date: Dec. 20, 2012

(65) Prior Publication Data
US 2014/0175897 A1    Jun. 26, 2014

(30) Foreign Application Priority Data
Jun. 17, 2011   (JP) .................. 2011-135390

(51) Int. Cl.
*H02J 7/02* (2016.01)
*H01F 38/14* (2006.01)
(Continued)

(52) U.S. Cl.
CPC ........... *H04B 5/0037* (2013.01); *B60L 11/182* (2013.01); *H01F 38/14* (2013.01); *H01M 10/46* (2013.01);
(Continued)

(58) Field of Classification Search
CPC ... B60L 5/005; B60L 11/1809; B60L 11/1811; B60L 11/1812; B60L 11/182; B60L 11/1829; H01F 38/14; H02J 5/00; H02J 5/005; H02J 7/025; H02J 17/00; H02J 50/00; H02J 50/10; H02J 50/12; H04B 5/0037; H04B 5/0075; H04B 5/0081; H04B 5/0087; H04B 5/0093; Y02T 10/7005; Y02T 10/7072; Y02T 90/122
(Continued)

(56) References Cited

U.S. PATENT DOCUMENTS

| 2005/0135129 A1 | 6/2005 | Kazutoshi |
| 2009/0033462 A1* | 2/2009 | Kitayoshi .......... G06K 19/0723 340/10.1 |

(Continued)

FOREIGN PATENT DOCUMENTS

| CN | 1625018 A | 6/2005 |
| CN | 201230219 | 4/2009 |

(Continued)

OTHER PUBLICATIONS

Brown, "Status of the Microwave Power Transmission Components for the Solar Power Satellite", IEEE, No. 20, Dec. 31, 1981, 3 pgs.
(Continued)

*Primary Examiner* — Levi Gannon
(74) *Attorney, Agent, or Firm* — Baker & Hostetler LLP

(57) ABSTRACT

A resonance system that receives power from a power source section is configured by at least a primary resonance coil, a secondary resonance coil, and a load. The output frequency $f_o$ of the power source section is set to lie within one of the frequency ranges $f_1 \leq f_o \leq f_2$, $f_3 \leq f_o \leq f_4$, . . . , $f_{2n-1} \leq f_o \leq f_{2n}$. The frequencies $f_1$, $f_2$, $f_3$, $f_4$, . . . , $f_{2n-1}$, $f_{2n}$ ($f_1 < f_2 < f_3 < \ldots < f_{2n-1} < f_{2n}$) are defined such that, if the input (Continued)

impedances of the resonant system at the time of supply of power of the frequencies $f_1, f_2, f_3, f_4, \ldots f_{2n-1}, f_{2n}$ ($f_1 < f_2 < f_3 < \ldots < f_{2n-1} < f_{2n}$) to the resonant system are represented by $Z_1, Z_2, Z_3, \ldots, Z_{2n-1}, Z_{2n}$, the input impedances satisfy $Z_1 = Z_2, Z_3 = Z_4, \ldots, Z_{2n-1} = Z_{2n}$.

4 Claims, 5 Drawing Sheets

(51) Int. Cl.
| | | |
|---|---|---|
| *H04B 5/00* | (2006.01) | |
| *H01M 10/46* | (2006.01) | |
| *B60L 11/18* | (2006.01) | |
| *H02J 17/00* | (2006.01) | |

(52) U.S. Cl.
CPC ............ *H02J 7/025* (2013.01); *H02J 17/00* (2013.01); *H02J 50/12* (2016.02); *H04B 5/0093* (2013.01); *Y02T 10/7005* (2013.01); *Y02T 10/7072* (2013.01); *Y02T 90/122* (2013.01); *Y02T 90/14* (2013.01)

(58) Field of Classification Search
USPC ........................................................ 307/104
See application file for complete search history.

(56) References Cited

U.S. PATENT DOCUMENTS

| | | | |
|---|---|---|---|
| 2009/0066440 A1 | 3/2009 | Chan Wai Po et al. | |
| 2010/0052431 A1 | 3/2010 | Mita | |
| 2010/0164297 A1* | 7/2010 | Kurs | H01Q 1/248 |
| | | | 307/104 |
| 2011/0227421 A1* | 9/2011 | Sakoda | B60L 11/182 |
| | | | 307/104 |
| 2011/0241440 A1 | 10/2011 | Sakoda et al. | |
| 2011/0316348 A1 | 12/2011 | Kai et al. | |
| 2014/0175897 A1 | 6/2014 | Taguchi et al. | |

FOREIGN PATENT DOCUMENTS

| | | |
|---|---|---|
| CN | 101667754 A | 3/2010 |
| EP | 2320538 | 5/2011 |
| EP | 2348610 | 7/2011 |
| EP | 2722966 | 4/2014 |
| EP | 2722967 | 4/2014 |
| JP | 2005-184526 | 7/2005 |
| JP | 2010-041558 | 2/2010 |
| JP | 2010-114964 | 5/2010 |
| JP | 2010-233442 | 10/2010 |
| WO | WO 2007/008646 A2 | 1/2007 |
| WO | WO 2007/086462 | 1/2007 |
| WO | WO 2010/067763 | 6/2010 |

OTHER PUBLICATIONS

CN 2012/8828777: Notification of the First Office Action (National Phase of PCT Application), dated Jun. 3, 2015, 13 pages.
Imura, et al., "Basic Experimental Study on Helical Antennas of Wireless Power Transfer for Electric Vehicles bu Using Magnetic Resonant Couplings", IEEE, Dec. 31, 2009, 936-940.
Jiawei, "Harmonics Elimination of Primary Side in Contactless Power Supply System", May 31, 2010, vol. 23(5), 109-111.
Ote et al., "Study on the Effect of Power Reflection on Efficiency of Electromagnetic Resonant Coupling Using Contactless Power Transfer System", IEEE of Japan Technical Meeting Record, Mar. 8, 2010, 35-39.
Imura et al., "Study of Magnetic and Electric Coupling for Contactless Power Transfer Using Equivalent Circuits", IEEJ Transactions on Industry Applications, Dengakuron D, The Institute of Electrical Engineers of Japan, Jan. 2010, vol. 130, No. 1, 84-88.
International Patent Application No. PCT/JP2012/062180: International Preliminary Report on Patentability dated Dec. 17, 2013, 6 pages.

\* cited by examiner

RESONANCE-TYPE NON-CONTACT POWER SUPPLY SYSTEM

CROSS-REFERENCE TO RELATED APPLICATIONS

This application is the National Stage of International Application No. PCT/JP2012/062180 filed May 11, 2012, which claims the benefit of Japanese Application No. 2011-135390, filed Jun. 17, 2011, the disclosures of which are incorporated herein by reference in their entireties.

FIELD OF THE INVENTION

The present invention relates to a resonance-type non-contact power supply system.

BACKGROUND OF THE INVENTION

Magnetic field resonance-based power transmission has conventionally been proposed (see Patent Document 1, for example). There has also been proposed a method for designing an easy-to-design and easy-to-manufacture non-contact power transmission apparatus (see Patent Document 2, for example). In the method for designing, a non-contact power transmission apparatus disclosed in Patent Document 2, the relationship between the input impedance and the frequency of a resonant system is put on a graph. Based on this, the frequency of an AC power source is set between a frequency at which the input impedance takes a local maximum value and a frequency that is higher than the frequency at which the input impedance takes the local maximum value, at which the input impedance takes a local minimum value.

PRIOR ART DOCUMENTS

Patent Documents

Patent Document 1: International Publication No. 2007/008646
Patent Document 2: Japanese Laid-Open Patent Publication No. 2010-114964

SUMMARY OF THE INVENTION

Patent Document 1, however, discloses no specific method of identifying the resonant frequency of a resonant system for magnetic field resonance. It has therefore been difficult to design and manufacture resonance-type non-contact power supply systems that transmit power efficiently. Patent Document 2 discloses a specific method of identifying the resonant frequency of the resonant system, which allows a resonance-type non-contact power transmission apparatus to be designed easily.

It is hence an objective of the present invention to provide an easy-to-design and easy-to-manufacture resonance-type non-contact power supply system having a high power transmission efficiency.

To achieve the foregoing objective and in accordance with one aspect of the present invention, a resonance-type non-contact power supply system is provided that includes power supply equipment and power receiving equipment. The power supply equipment includes a power source section and a primary resonance coil configured to be supplied with power from the power source section. The power receiving equipment includes a secondary resonance coil configured to receive power from the primary resonance coil by magnetic field resonance and a load configured to be supplied with power received at the secondary resonance coil. At least the primary resonance coil, the secondary resonance coil, and the load constitute a resonant system. The output frequency $f_o$ of the power source section is set to lie within one of the frequency ranges $f_1 \leq f_o \leq f_2$, $f_3 \leq f_o \leq f_4$, ..., $f_{2n-1} \leq f_o \leq f_{2n}$. The frequencies $f_1$, $f_2$, $f_3$, $f_4$, ..., $f_{2n-1}$, $f_{2n}$ ($f_1 < f_2 < f_3 < \ldots < f_{2n-1} < f_{2n}$) are defined such that, if the input impedances of the resonant system at the time of supply of power of the frequencies $f_1$, $f_2$, $f_3$, $f_4$, ..., $f_{2n-1}$, $f_{2n}$ ($f_1 < f_2 < f_3 < \ldots < f_{2n-1} < f_{2n}$) to the resonant system are represented by $Z_1$, $Z_2$, $Z_3$, ..., $Z_{2n-1}$, $Z_{2n}$, the input impedances satisfy $Z_1 = Z_2$, $Z_3 = Z_4$, ..., $Z_{2n-1} = Z_{2n}$.

In this aspect, since the output frequency $f_o$ of the power source section satisfies the condition above, it is possible to increase the power transmission efficiency. In the case of designing such a resonance-type non-contact power supply system, it is also necessary to set the output frequency of the power source section to a frequency that satisfies the conditions of use allowed in the Radio Law and therefore to set the frequency equal to or close to the resonant frequency of the resonant system of the resonance-type non-contact power supply system. In the resonance-type non-contact power supply system according to the present invention, it is easy to set the resonant frequency of the resonant system, which is constituted by at least the primary resonance coil and the secondary resonance coil using components depending on the magnitude of power to be transmitted to the load, to a frequency that satisfies the conditions of use allowed in the Radio Law. The resonance-type non-contact power supply system can therefore be designed and manufactured easily.

In accordance with another aspect of the present invention, at least one of the power supply equipment and the power receiving equipment is provided with an induction coil configured to supply power received from the power source section to the primary resonance coil by electromagnetic induction or with an induction coil configured to draw power received at the secondary resonance coil by electromagnetic induction. At least the induction coil, the primary resonance coil, the secondary resonance coil, and the load constitute the resonant system.

The resonance-type non-contact power supply system is only required to include at least two resonance coils, that is, the primary and secondary resonance coils to provide non-contact power supply between the power supply equipment and the power receiving equipment. However, adjustment to a matching state can be made more easily by providing at least one of an induction coil configured to supply power received from the power source section to the primary resonance coil by electromagnetic induction and an induction coil configured to draw power received at the secondary resonance coil by electromagnetic induction. Further, adjustment to the matching state can be made even more easily by providing all of the primary resonance coil, the secondary resonance coil, and the two induction coils.

In accordance with another aspect of the present invention, the induction coil is provided in each of the power supply equipment and the power receiving equipment. Adjustment to a matching state can therefore be made easily compared to the case where the induction coil is provided in only one of the power supply equipment and the power receiving equipment.

In accordance with yet another aspect of the present invention, the power supply equipment includes a matching device for matching the input impedance of the resonant system with the impedance on the power source section side as viewed from the input end of the resonant system and a matching device control means (matching device control section) for adjusting the matching device. In the present invention, the matching device built in the power supply equipment is adjusted by the matching device control means to match the input impedance of the resonant system with the impedance on the power source section side as viewed from the input end of the resonant system. It is therefore possible to keep the power transmission efficiency high even when the input impedance of the resonant system changes. In addition, the power supply equipment can respond to a change in the input impedance of the resonant system without acquiring information on the power receiving equipment.

Effects of the Invention

The present invention thus provides an easy-to-design and easy-to-manufacture resonance-type non-contact power supply system having a high power transmission efficiency.

DETAILED DESCRIPTION OF THE PREFERRED EMBODIMENTS

First Embodiment

A resonance-type non-contact charging system for charging an in-vehicle battery according to a first embodiment of the present invention will hereinafter be described with reference to FIGS. 1 to 4.

Figure 1:
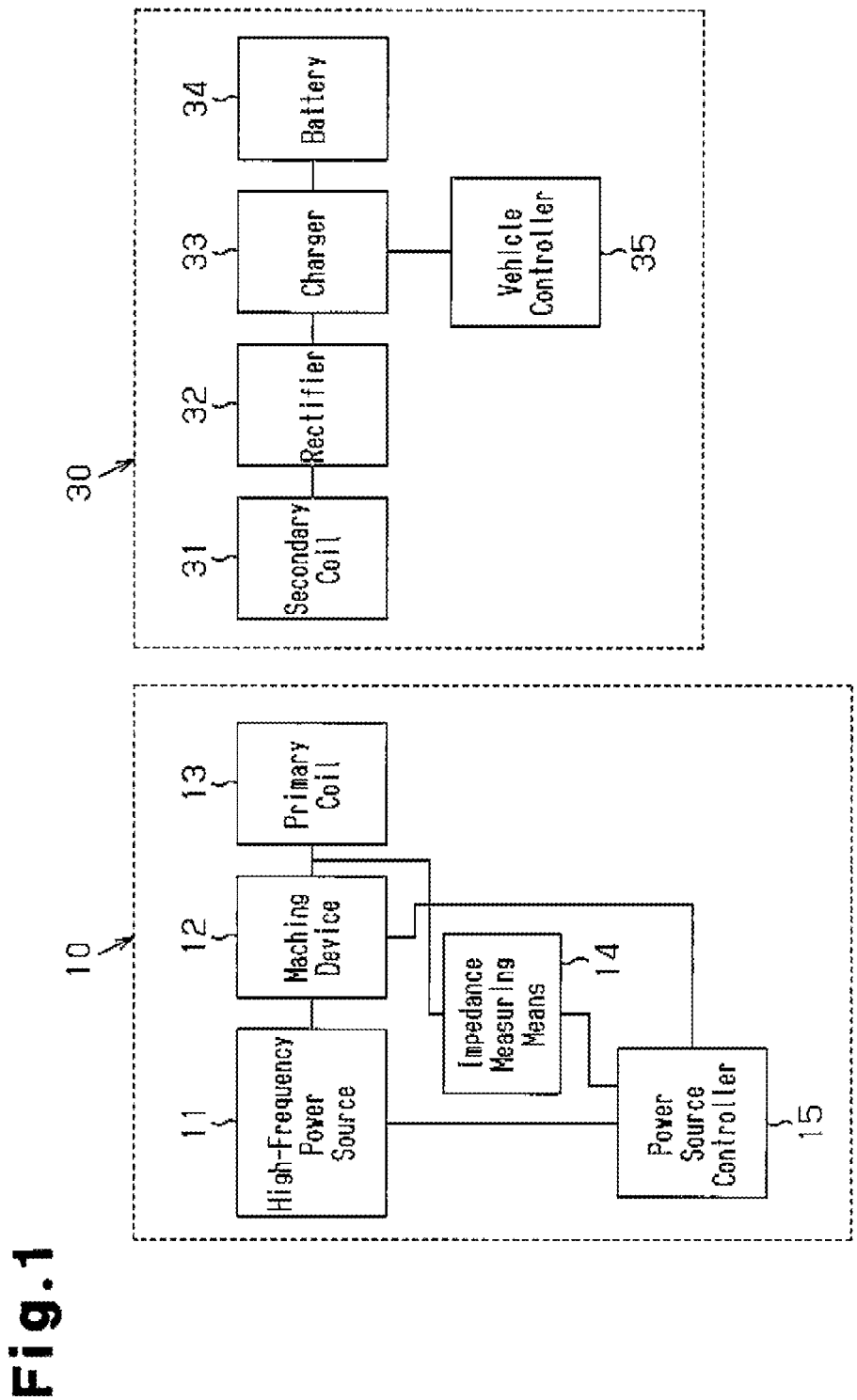
FIG. 1 is a configuration diagram of a resonance-type non-contact charging system according to a first embodiment.

An shown in FIG. 1, the resonance-type non-contact charging system, which serves as a resonance-type non-contact power supply system, includes power supply equipment 10 installed on the ground and power receiving equipment 30 built in a vehicle serving as a mobile unit.

The power supply equipment 10 includes a high-frequency power source 11 serving as a power source section, a matching device 12 connected to an output part of the high-frequency power source 11, a primary coil 13, an impedance measuring means (impedance measuring section) 14, and a power source controller 15. A power measuring device and a phase measuring device are used as the impedance measuring means 14.

The power receiving equipment includes a secondary coil 31, a rectifier 32, a charger 33, a battery (secondary battery) 34 connected to the charger 33, and a vehicle controller 35. The rectifier 32, the charger 33, and the battery 34 constitute a load.

The primary coil 13, the secondary coil 31, and the load (the rectifier 32, the charger 33, and the battery 34) constitute a resonant system.

Figure 2:
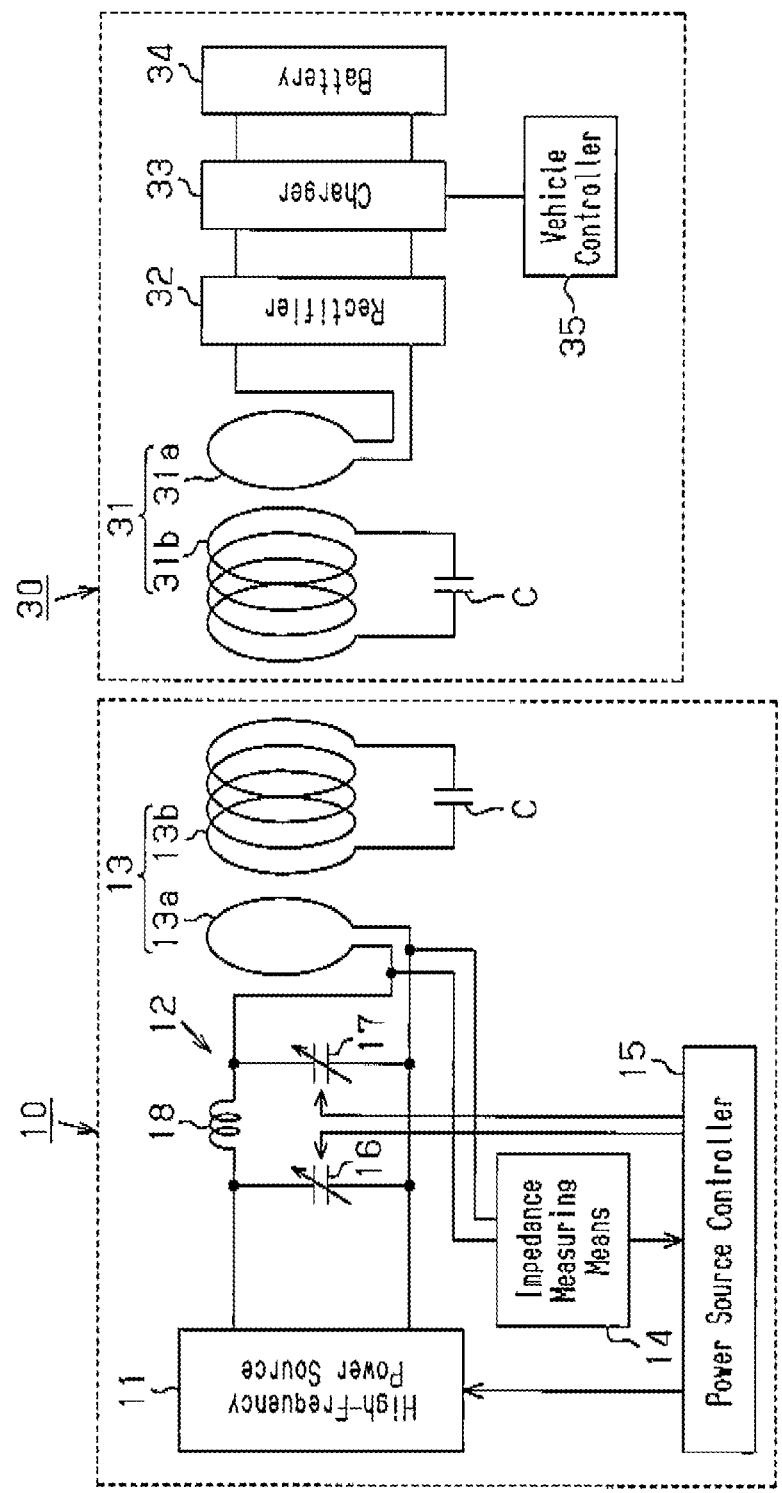
FIG. 2 is a circuit diagram partially showing the system of FIG. 1.

As shown in FIG. 2, the primary coil 13 includes a primary induction coil 13a and a primary resonance coil 13b. The primary induction coil 13a is connected to the high-frequency power source 11 via the matching device 12. The primary induction coil 13a and the primary resonance coil 13b are arranged coaxially, and a capacitor C is connected to the primary resonance coil 13b. The primary induction coil 13a is coupled with the primary resonance coil 13b by electromagnetic induction, so that AC power supplied from the high-frequency power source 11 to the primary induction coil 13a is supplied to the primary resonance coil 13b by electromagnetic induction.

As shown in FIG. 2, the matching device 12 includes two variable capacitors 16 and 17 and an inductor 18. The variable capacitor 16 is connected to the high-frequency power source 11, and the variable capacitor 17 is connected in parallel to the primary induction coil 13a. The inductor 18 is connected between the variable capacitors 16 and 17. The impedance of the matching device 12 changes with a change in the capacitance of the variable capacitors 16 and 17.

The impedance measuring means 14 is connected to the primary induction coil 13a of the primary coil 13 and outputs a measurement result to the power source controller 15. Based on the measurement result from the impedance measuring means 14, the power source controller 15 adjusts the matching device 12 to match the input impedance of the resonant system with the impedance on the side of the high-frequency power source 11 as viewed from the input end of the resonant system. The impedance on the side of the high-frequency power source 11 as viewed from the input end of the resonant system is, in other words, the impedance from the power source section (high-frequency power source 11) to the input end of the resonant system in this embodiment. The power source controller 15 also serves as matching device control means (matching device control section).

The secondary coil 31 includes a secondary induction coil 31a and a secondary resonance coil 31b. The secondary induction coil 31a and the secondary resonance coil 31b are arranged coaxially, and a capacitor C is connected to the secondary resonance coil 31b. The secondary induction coil 31a is coupled with the secondary resonance coil 31b by electromagnetic induction, so that AC power supplied resonantly from the primary resonance coil 13b to the secondary resonance coil 31b is supplied to the secondary induction coil 31a by electromagnetic induction. The secondary induction coil 31a is connected to a rectifier 32. In this embodiment, the primary resonance coil 13b and the secondary resonance coil 31b are formed in the same configuration and the capacitors C have the same capacitance.

The output frequency $f_o$ of the high-frequency power source 11 satisfies the conditions of use allowed in the Radio Law. The output frequency $f_o$ is also set to lie within one of the ranges $f_1 \leq f_o \leq f_2$, $f_3 \leq f_o \leq f_4$, ..., $f_{2n-1} \leq f_o \leq f_{2n}$.

Next will be described a method for designing the thus configured resonance-type non-contact charging system.

This design method is based on the finding of the inventors of this application that, if the input impedances of the resonant system are represented by $Z_1, Z_2, Z_3, \ldots, Z_{2n-1}$, $Z_{2n}$ when supplied with power of the different frequencies $f_1$, $f_2$, $f_3$, ... $f_n$ ($f_1<f_2<f_3< ... <f_{2n-1}<f_{2n}$). "there are the frequencies at which the impedances satisfy $Z_1=Z_2$, $Z_3=Z_4$, ..., $Z_{2n-1}=Z_{2n}$ and, in this case, the resonant frequencies $f_{o1}$, $f_{o2}$, $f_{o3}$, ..., $f_{on}$ of the resonant system lie within the respective ranges $f_1 \leq f_{o1} \leq f_2$, $f_2 \leq f_{o2} \leq f_4$, ..., $f_{2n-1} \leq f_{on} \leq f_{2n}$". In addition, for the impedance $Z_i=R_i+jX_i$, $Z_1=Z_2$ means $R_1=R_2$ and $X_1=X_2$.

When designing a resonance-type non-contact charging system, general specifications are determined for the matching device 12, the primary coil 13, the secondary coil 31, and the load (the rectifier 32, the charger 33, and the battery 34) that constitute a resonant system. Next, the resonant system is assembled, and than supplied with power of different frequencies from the power source section than can output frequencies satisfying the conditions of use allowed in the Radio Law. At the time, the input impedance of the resonant system is measured. A power measuring device and a phase measuring device, for example, are used to measure the input impedance. It is then determined, based on the measurement result, whether or not there is a combination of two frequencies of the power source section at which the input impedances become equal. If there is a combination of two frequencies (e.g., $f_1$ and $f_2$) at which the input impedances become equal within the measured frequency range, the resonant frequency of the resonant system lies between $f_1$ and $f_2$. If there is no combination of frequencies at which the input impedances become equal within the measured frequency range, the measurement is made again with the interval between the output frequencies of the power source section being reduced and/or the frequency range measured being widened. Next, the output of the power source section is changed within the frequency range from $f_1$ to $f_2$ and the power transmission efficiency is measured at each frequency. From the measurement result, the frequency at which the power transmission efficiency is maximized is the resonant frequency of the resonant system. Based on the result, the resonant system is designed such that the output frequency of the power source section to be used and the resonant frequency of the resonant system have the same value. In some cases, there are multiple combinations of frequencies at which the input impedances become equal within the measured frequency range. In such cases, the frequency at which the power transmission efficiency is maximized within the frequency range defined by the combination of the lowest frequencies, for example, is identified and, based on the result, the resonant system is designed.

In this embodiment, when designing and manufacturing a resonance-type non-contact charging system, the power source section (high-frequency power source 11) is first set and then specifications for the components constituting the resonant system are set such that the output frequency of the power source section becomes equal to the resonant frequency of the resonant system. This allows the power source section to employ a configuration with a widened output frequency range and/or a configuration without a function of fine increase-decrease adjustment of the output frequency. This reduces the costs for the power source.

Example 1

Figure 3:
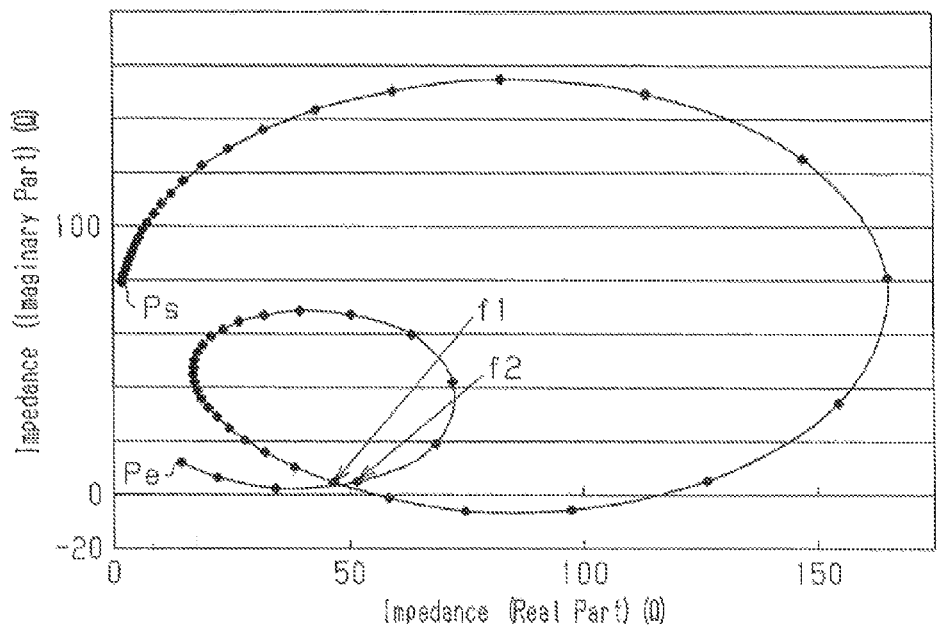
FIG. 3 is a graph showing the relationship between the real part and the imaginary part of input impedances when power is supplied at different frequencies.

FIG. 3 shows the relationship between the real part and the imaginary part of input impedances of a resonant system measured by changing the output frequency of a common high-frequency power source having a fixed output impedance of 50Ω within the range from 9.50 MHz to 11.00 MHz. The output frequency was changed incrementally by 0.025 MHz from 9.50 MHz. In addition, FIG. 3, the point Ps corresponds to an output frequency of 9.50 MHz and the point Pe corresponds to an output frequency of 11.00 MHz.

As shown in FIG. 3, the input impedance of the resonant system did not change monotonically with the increase in the output frequency of the high-frequency power source, but increased both in the real part and the imaginary part with the increase in the frequency within the range frees 9.50 to 10.10 Mhz, and then increased in the real part but decreased in the imaginary part with the increase in the frequency to 10.18 MHz. With a further increase in the frequency, the input impedance changed to decrease both in the real part and the imaginary part, decrease in the real part but increase in the imaginary part, increase both in the real part and the imaginary part, increase in the real part but decrease in the imaginary part, decrease both in one real part and the imaginary part, and decrease in the real part but increase in the imaginary part.

In FIG. 3, the input impedance $Z_1$ at the point $f_1$ is approximately equal to the input impedance $Z_2$ at the point $f_2$.

$f_1$=10.325 MHz, $Z_1$=46.7+$j$4.69

$f_2$=10.925 MHz, $Z_2$=51.6+$j$4.85

$Z_1=Z_2$ did not hold strictly because the data acquisition in the experiment was not fine, but acquiring data more finely than the 0.025 MHz interval for the increase in the output frequency of the high-frequency power source is predicted to result in that the lower one $f_1$ and the higher one $f_2$ of the frequencies corresponding to the intersection of the curve shown in FIG. 3 satisfy $Z_1=Z_2$.

Figure 4:
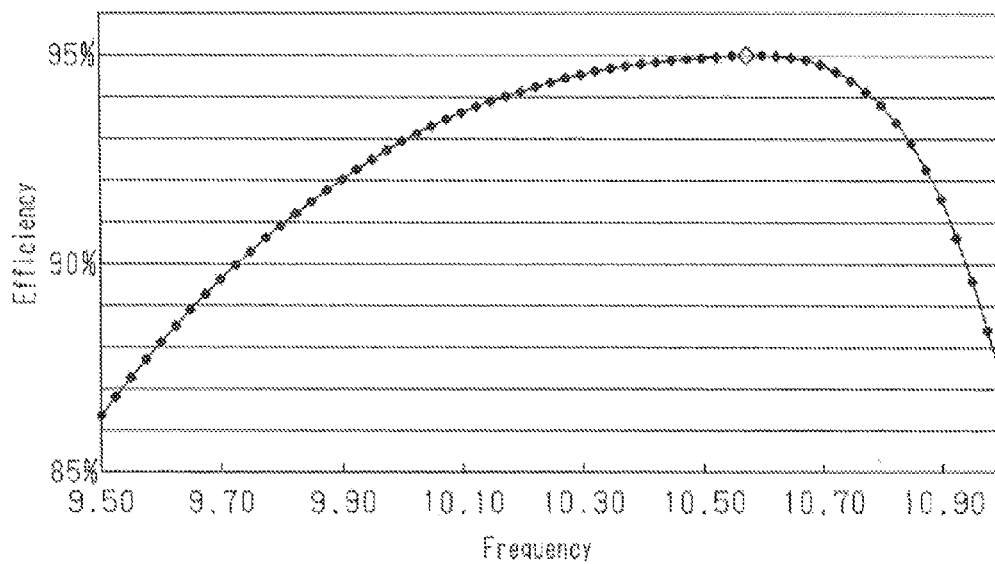
FIG. 4 is a graph showing the relationship between the output frequency of a high-frequency power source and the power transmission efficiency.

FIG. 4 shows a result of a measurement of the power transmission efficiency at different output frequencies of the high-frequency power source changed within the range from 9.5 to 11.0 MHz. From FIG. 4, the frequency of 10.575 MHz, at which the power transmission efficiency was maximized (95.05%) in the resonant system, is defined as the resonant frequency $f_o$ of the resonant system. The resonant frequency $f_o$ (10.575 MHz) lies between $f_1$ (10.325 MHz) and $f_2$ (10.925 MHz) to satisfy tire relationship $f_1 \leq f_o \leq f_2$.

To confirm that no frequency at which the power transmission efficiency was maximized lies outside the range between $f_1$ and $f_2$, the power transmission efficiency was measured at different output frequencies of the high-frequency power source changed within the range from 9.5 to 11.0 MHz. As a result, it was confirmed that the frequency at which the power transmission efficiency was maximized lay only between $f_1$ and $f_2$. It is therefore possible to determine the value of the resonant frequency $f_o$ by changing the output frequency of the high-frequency power source within the frequency range from $f_1$ to $f_2$ and measuring the power transmission efficiency at each frequency.

Next will be described the behavior of the thus configured resonance-type non-contact charging system.

The in-vehicle battery 34 is to be charged when the vehicle is stopped at a predetermined position near the power supply equipment 10. The power source controller 15, when it receives a charge request signal, causes the high-frequency power source 11 to output high-frequency power to the primary induction coil 13a at the output frequency $f_o$, which is equal to the resonant frequency of the resonant system. In addition, the charge request signal is output from the vehicle controller 35 or by operating a switch (not shown) provided in the power supply equipment 10.

High-frequency power is then output from the high-frequency power source 11 to the primary induction coil 13a at the resonant frequency of the resonant system, which in turn causes a magnetic field to be generated by electromagnetic induction in the power-supplied primary induction coil 13a. The magnetic field is enhanced through the magnetic field resonance between the primary resonance coil 13b and the secondary resonance coil 31b. From the enhanced magnetic field in the vicinity of the secondary resonance coil 31b, AC power is drawn by electromagnetic induction through the secondary induction coil 31a and rectified through the rectifier 32, and thereafter the charger 33 charges the battery 34.

The power source controller 15 receives a detection signal from the impedance measuring means 14 and, based on the detection signal, obtains the input impedance of the resonant system, and then adjusts the matching device 12 to match the input impedance of the resonant system with the impedance on the side of the high-frequency power source 11 as viewed from the input end of the resonant system.

During charging, the state-of-charge of the battery 34 changes and accordingly the input impedance of the resonant system also changes.

During charging, the power source controller 15 obtains the input impedance of the resonant system based on a detection signal from the impedance measuring means 14 and adjusts the matching device 12 to match the input impedance of the resonant system with the impedance on the side of the power source section (high-frequency power source 11) as viewed from the input end of the resonant system. This allows for efficient power supply from the power supply equipment 10 to the power receiving equipment 30 and therefore efficient charging even when the state-of-charge of the battery 34 changes.

When the battery 34 becomes fully charged, the vehicle controller 35 stops charging by the charger 33 and sends a charge termination signal to the power source controller 15. Even before the battery reaches full charge, when the driver inputs a charge stop command, for example, the vehicle controller 35 stops charging by the charger 33 and sends a charge termination signal to the power source controller 15. Receiving the charge termination signal, the power source controller 15 terminates the power transmission (power supply).

This embodiment offers the following advantages.

(1) The resonance-type non-contact charging system includes the power supply equipment 10 including the high-frequency power source 11 and the primary resonance coil 13b configured to be supplied with power from the high-frequency power source 11, the secondary resonance coil 31b configured to receive power from the primary resonance coil 13b by magnetic field resonance, and the power receiving equipment 30 including the load configured to be supplied with power received at the secondary resonance coil 31b. The power supply equipment 10 is provided with the induction coil (primary induction coil 13a) configured to supply power received from the high-frequency power source 11 to the primary resonance coil 13b by electromagnetic induction. At least the primary induction coil 13a, the primary resonance coil 13b, the secondary resonance coil 31b, and the load constitute the resonant system, and the output frequency $f_o$ of the power source section (high-frequency power source 11) is set to lie within one of the frequency ranges $f_1 \leq f_o \leq f_2$, $f_3 \leq f_o \leq f_4$, ..., $f_{2n-1} \leq f_o \leq f_{2n}$. If the input impedances of the resonant system are represented by $Z_1, Z_2, Z_3, \ldots Z_{2n-1}, Z_{2n}$, the frequencies $f_1, f_2, f_3, f_4, \ldots, f_{2n-1}, f_{2n}$ ($f_1 < f_2 < f_3 < \ldots < f_{2n-1} < f_{2n}$) are defined as values at which the input impedances satisfy $Z_1 = Z_2, Z_3 = Z_4, \ldots, Z_{2n-1} = Z_{2n}$. The system can therefore be designed and manufactured easily and have a high power transmission efficiency. If the output frequency $f_o$ is thus set equal to the resonant frequency of the resonant system, the power transmission efficiency is maximized.

(2) In designing of a resonance-type non-contact charging system, general specifications are determined for the components constituting the resonant system to set the output frequency of the power source section (e.g., high-frequency power source) included in the system equal to the resonant frequency of the resonant system. Next, the resonant system is assembled, and then supplied with power of different frequencies from the power source section that can output frequencies satisfying the conditions of use allowed in the Radio Law and, at the time, the input impedance of the resonant system is measured. It is determined, based on the measurement result, whether or not there are frequencies of the power source section having the same input impedance to find a combination of different frequencies $f_1$ and $f_2$ at which the input impedances $Z_1$ and $Z_2$ become equal. As a result, the frequency at which the power transmission efficiency is maximized within the frequency range from $f_1$ to $f_2$ is the resonant frequency of the resonant system. The resonant frequency of the resonant system can thus be set easily.

(3) In the resonance-type non-contact charging system, the power supply equipment 10 is provided with the induction coil (primary induction coil 13a) configured to supply power received from the high-frequency power source 11 to the primary resonance coil 13b by electromagnetic induction. The power receiving equipment 30 is provided with the induction coil (secondary induction coil 31a) configured to be supplied, by electromagnetic induction, with AC power supplied from the primary resonance coil 13b to the secondary resonance coil 31b by magnetic field resonance. Adjustment to a matching state can therefore be made easily compared to the case where only one of the primary induction coil 13a and the secondary induction coil 31a is provided.

(4) The power supply equipment 10 includes the matching device 12 for snatching the input impedance of the resonant system with the impedance on the side of the power source section (high-frequency power source 11) as viewed from the input end of the resonant system and matching device control means for adjusting the matching device 12. It is therefore possible to keep the power transmission efficiency high even when the input impedance of the resonant system changes. In addition, the power supply equipment 10 can respond to a change in the load without acquiring information on the power receiving equipment 30.

Second Embodiment

Next will be described a second embodiment of the present invention with reference to FIGS. 5 to 7. The second embodiment is different from the above-described first embodiment in that only one coil is included in each of the power supply equipment 10 and the power receiving equipment 30 to constitute the resonant system. Components identical to those in the first embodiment are designated by the same reference numerals to omit the detailed description thereof.

Figure 5:
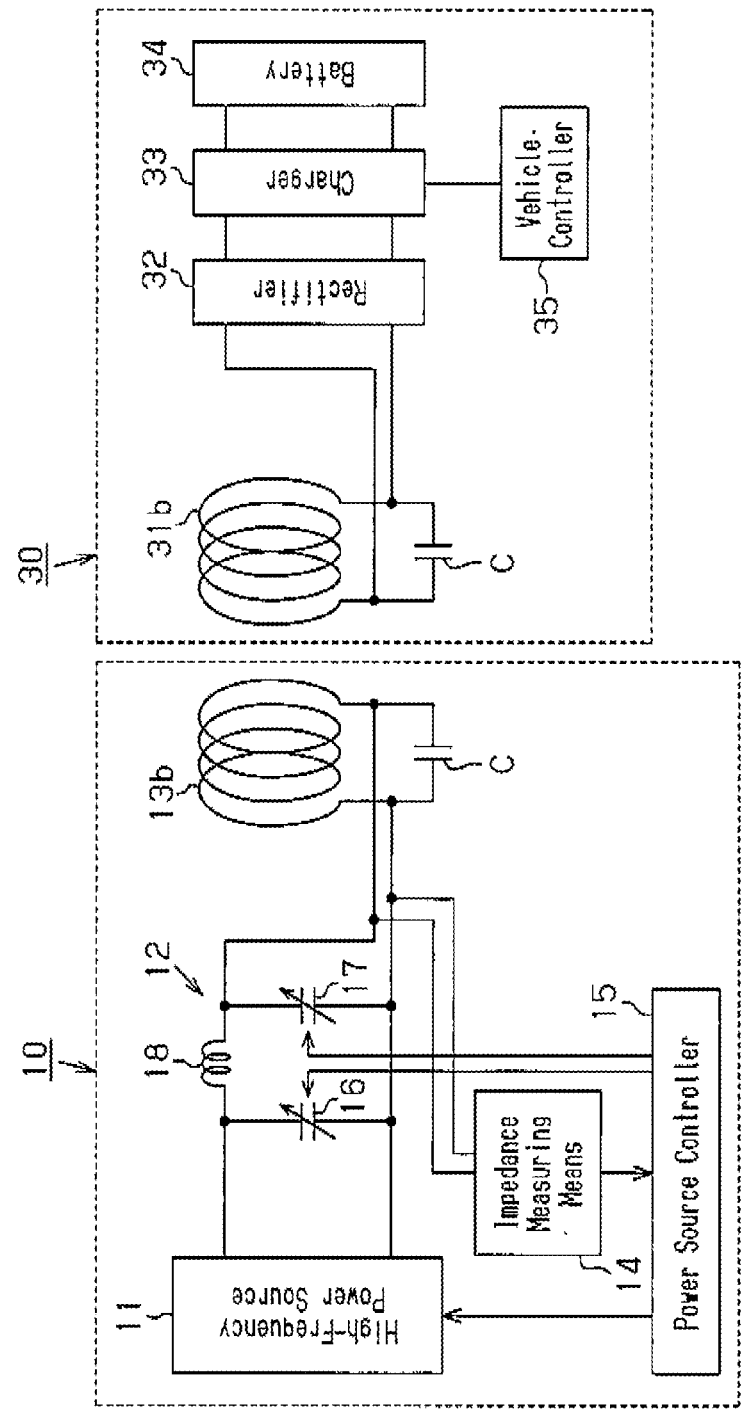
FIG. 5 is a circuit diagram partially showing a resonance-type non-contact charging system according to a second embodiment.

As shown in FIG. 5, the primary resonance coil 13b is connected to the high-frequency power source 11 through the matching device 12. The secondary resonance coil 31b is connected to the rectifier 32. That is, the primary coil 13 does not include a primary induction coil 13a but only the primary resonance coil 13b. The secondary coil 31 does not include a secondary induction coil 31a but only the secondary resonance coil 31b.

In this embodiment, when charging the in-vehicle battery 34, high-frequency power is output from the high-frequency power source 11 to the primary resonance coil at the resonant frequency of the resonant system and enhanced through the magnetic field resonance between the primary resonance coil 13b and the secondary resonance coil 31b. AC power output from the secondary resonance coil 31b is then rectified through the rectifier 32, and thereafter the charger 33 charges the battery 34.

Example 2

An experiment was conducted similar to that of Example 1 in the first embodiment to confirm that a resonance-type charging system can be designed similarly to the first embodiment even if only one coil is included in each of the primary and secondary sides of the resonant system. The range of the output frequency of the high-frequency power source was set lower than example 1 in the first embodiment. FIG. 3 shows the relationship between the real part and the imaginary part of input impedances of a resonant system measured by changing the output frequency within the range from 50 to 200 kHz. In addition, in FIG. 6, the point Ps corresponds to an output frequency of 50 kHz and the point Pe corresponds to an output frequency of 200 kHz.

Figure 6:
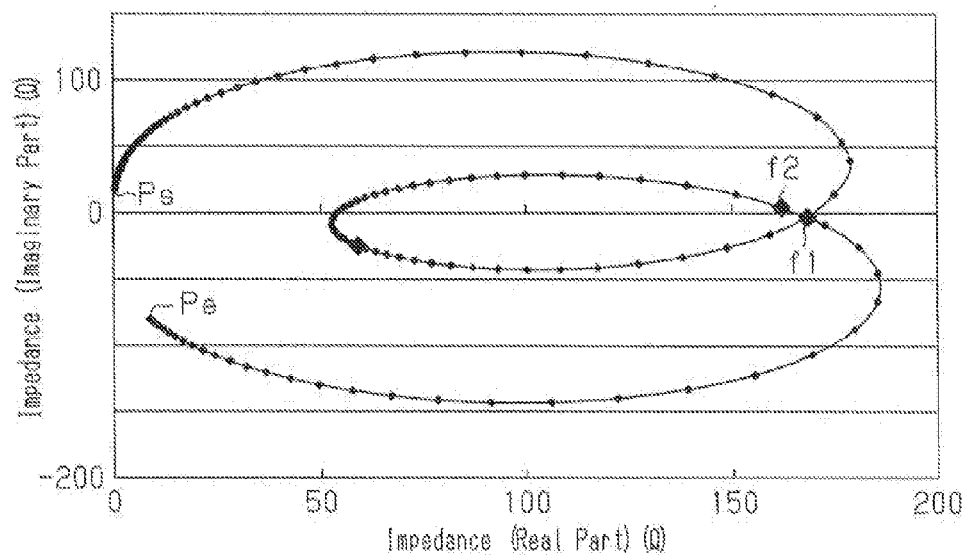
FIG. 6 is a graph showing the relationship between the real part and the imaginary part of input impedances when power is supplied at different frequencies.

As shown in FIG. 6, the input impedance of the resonant system did not change monotonically with the increase in the output frequency of the high-frequency power source, but increased both in the real part and the imaginary part with the increase in the frequency within the range from 50 to 114 kHz, and then increased in the real part but decreased in the imaginary part with the increase in the frequency to 121 kHz. With the further increase in the frequency, the input impedance changed to decrease both in the real part and the imaginary part, decrease in the real part but increase in the imaginary part, increase both in the real part and the imaginary part, increase in the real part but decrease in the imaginary part, decrease both in the real part and the imaginary part, and decrease in the real part but increase in the imaginary part.

In FIG. 6, the input impedance $Z_1$ at the point $f_1$ is approximately equal to the input impedance Z2 at the point $f_2$.

$f_1$=123 kHz, $Z_1$168.57+$j$2.49

$f_2$=171 kHz, $Z_2$=162.0+$j$4.12

$Z_1$=$Z_2$ did not hold strictly because the data acquisition in the experiment was not fine, but acquiring data more finely than the 1 kHz interval for the increase in the output frequency of the high-frequency power source is predicted to result in that the lower one $f_1$ and the higher one $f_2$ of the frequencies corresponding to the intersection of the curve shown in FIG. 6 satisfy $Z_1$=$Z_2$.

Figure 7:
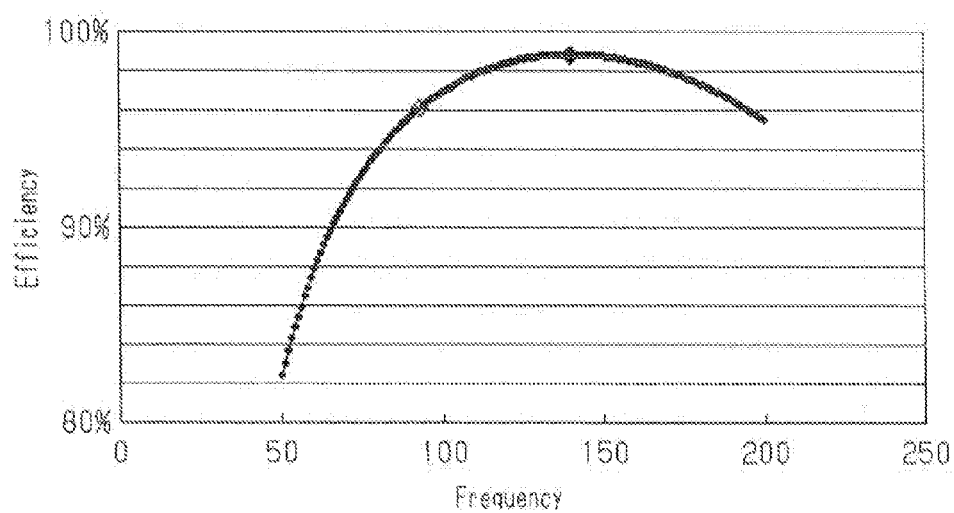
FIG. 7 is a graph showing the relationship between the output frequency of a high-frequency power source and the power transmission efficiency.

FIG. 7 shows a result of a measurement of the power transmission efficiency at different output frequencies of the high-frequency power source changed within the range from 50 to 200 kHz. From FIG. 7, the frequency of 140 kHz, at which the power transmission efficiency was maximized (98.80%) in the resonant system, was defined as the resonant frequency $f_o$ of the resonant system. The resonant frequency $f_o$ (140 kHz) lay between $f_1$ (123 kHz) and $f_2$ (171 kHz) to satisfy the relationship $f_1 \leq f_o \leq f_2$.

To confirm that no frequency at which the power transmission efficiency was maximized lay outside the range between $f_1$ and $f_2$, the power transmission efficiency was measured at different output frequencies of the high-frequency power source changed within the range from 50 to 200 kHz. As a result, it was confirmed that the frequency at which the power transmission efficiency was maximized lay only between $f_1$ and $f_2$. It is therefore possible to obtain the value of the resonant frequency $f_o$ by changing the output frequency of the high-frequency power source within the frequency range from $f_1$ to $f_2$ and measuring the power transmission efficiency at each frequency.

This second embodiment basically offers the same advantages (1), (2) and (4) in the first embodiment, and additionally the following advantage.

(5) Since only one coil is included in each of the power supply equipment 10 and the power receiving equipment 30 to constitute the resonant system, the size of the resonant system can be reduced, which facilitates securing a space for the power receiving equipment 30 to be built in the vehicle and increases the flexibility of the built-in position.

The present invention is not limited to the above-described embodiments, but may be modified as follows, for example.

The output frequency $f_o$ of the high-frequency power source 11 does not necessarily need to be equal to the resonant frequency of the resonant system, tout may deviate slightly from the resonant frequency within a range in which the resonance-type non-contact power supply system achieves a desired performance (power transmission efficiency).

The resonance-type non-contact power supply system does not necessarily require all of the primary induction coil 13a, the primary resonance coil 13b, the secondary induction coil 31a, and the secondary resonance coil 31b to provide non-contact power supply between the power supply equipment 10 and the power receiving equipment 30, but both the primary induction coil 13a and the secondary induction coil 31a may be omitted as in the second embodiment. Alternatively, one of the primary induction coil 13a and the secondary induction coil 31a may be omitted. However, the configuration including all of the primary induction coil 13a, the primary resonance coil 13b, the secondary induction coil 31a, and the secondary resonance coil 31b makes adjustment to a matching state more easily.

The power source section is not limited to such a high-frequency power source, but may, for example, output AC power supplied from the commercial power supply with the frequency thereof being converted.

The impedance measuring means 14 is not limited to the configuration of measuring the input impedance of the primary coil 13, but may measure the impedance at the input end of the matching device 12. In this case, the matching device 12 constitutes a part of the resonant system. The matching device 12 can therefore adjust the impedance of the resonant system, and thus the change in the impedance of the resonant system can be reduced by adjusting the matching device 12.

The resonance-type non-contact charging system does not necessarily need to include the impedance measuring means 14. If the impedance measuring means 14 is omitted, an external power measuring device and a phase measuring device are used to measure the impedance of the resonant system when designing and manufacturing the resonance-type non-contact charging system.

The output frequency $f_o$ of the power source section does not necessarily need to be equal to the resonant frequency of the resonant system as long as it lies within the frequency range $f_{2n-1} \le f_o \le f_{2n}$. The output frequency $f_o$ of the power source section, if it lies within the frequency range $f_{2n-1} \le f_o \le f_{2n}$, shows a higher power transmission efficiency than the other frequencies.

A DC/DC converter may be provided between the charger 33 and the rectifier 32, and the duty cycle of the DC/DC converter may be controlled based on the result of a measurement by the impedance measuring means 14.

When designing and manufacturing a resonance-type non-contact charging system, a power source section that can have an output frequency to be equal to the resonant frequency of a resonant system may be selected after selecting the components constituting the resonant system. In contrast, a power source section may be selected first, and then the specifications for the components constituting the resonant system may be changed to adjust the frequency of the resonant system such that the output frequency of the power source section becomes equal to the resonant frequency of the resonant system. This configuration allows an inexpensive power source section to be selected.

The power receiving equipment 30 may also be provided with a matching device. For example, the matching device may be provided between the secondary induction coil 31a and the rectifier 32, and the vehicle controller 35 may adjust the matching device. If the two coils, that is, the primary resonance coil 13b and the secondary resonance coil 31b, are only provided in the resonant system as in the second embodiment, both the power supply equipment 10 and the power receiving equipment 30 are preferably provided with a matching device.

The matching device 12 may be provided only on the secondary side (in the power receiving equipment 30). Alternatively, the matching device 12 may be provided neither on the primary side (in the power supply equipment 10) nor on the secondary side (in the power receiving equipment 30).

The rectifier 32 may be built in the charger 33.

The charger 33 may be omitted. Instead, the battery 34 may be charged directly with AC power output from the secondary coil 31 and rectified through the rectifier 32.

The matching device 12 is not limited to the configuration of including the two variable capacitors 16 and 17 and the inductor 18, but, for example, may include a variable inductor as the inductor 18 or may include a variable inductor and two non-variable capacitors.

The matching device may be a non-variable one.

A power factor corrector circuit (PFC circuit) may be provided instead of the matching device. In this case, phase-contrast measuring means (phase-contrast measuring section) is to be provided instead of the impedance measuring means 14.

The mobile unit is not limited to such a vehicle that requires a driver, but may be an automated guided vehicle.

The resonance-type non-contact charging system is not limited to such a system for charging the in-vehicle battery 34 in a non-contact manner, but may be a system for charging a battery built in a mobile unit such as a vessel or a self-propelled robot or a battery built in a portable electronic device such as a mobile phone or a portable personal computer in a non-contact manner.

The resonance-type non-contact power supply system is not limited to such a resonance-type non-contact charging system, but may be applied to a system for supplying power to an electrical device built in a mobile unit such as a robot.

The resonance-type non-contact power supply system may be moved to a predefined work place by transfer means (transfer section) such as a conveyor that is driven without receiving non-contact power transmission but with common power, and the power receiving equipment 30 may be built in an apparatus including a motor to be driven with constant power as a load.

The diameters of the primary induction coil 13a and the secondary induction coil 31a do not necessarily need to be equal to the diameters of the primary resonance coil 13b and the secondary resonance coil 31b, but may be smaller or greater than these.

In the second embodiment, the primary resonance coil 13b and the secondary resonance coil 31b do not necessarily need to include multiple turns, but may include one turn.

The capacitors C connected to the primary resonance coil 13b and the secondary resonance coil 31b may be omitted. The configuration with the capacitors C, however, is capable of having a resonant frequency lower than that without the capacitors C. In addition, for the same resonant frequency, the site of the primary resonance coil 13b and the secondary resonance coil 31b can be reduced compared to the configuration without the capacitors C.

The following technical ideas (inventions) are obtainable from the above-described embodiments.

(1) The invention according to claim 4 may be configured such that the power supply equipment includes an impedance measuring means for measuring the input impedance of the resonant system, and also includes the matching device control means for adjusting the matching device to match the input impedance of the resonant system with the impedance on the side of the power source section as viewed from the input end of the resonant system based on the result of a measurement by the impedance measuring means.

(2) The invention according to the technical idea (1) may be configured such that the power receiving equipment includes, as the load, a rectifier, a charger, and a battery.

(3) The invention according to the technical idea (1) or (2) may be configured such that the power receiving equipment is built in a vehicle.

(4) In the invention according to any one of claims 1 to 4 and the technical ideas (1) to (3), the output frequency of the power source section meets the conditions of use allowed in the Radio Law.

The invention claimed is:

1. A resonance-type non-contact power supply system comprising:
   power supply equipment including a power source section and a primary resonance coil configured to be supplied with power from the power source section; and
   power receiving equipment including a secondary resonance coil configured to receive power from the primary resonance coil by magnetic field resonance and a load configured to be supplied with power received at the secondary resonance coil, wherein
   the primary resonance coil, the secondary resonance coil, and the load constitute a resonant system,
   wherein within a predetermined range of frequencies, at least one combination of two frequencies of the power source section is determined, at which input impedances of the resonant become equal, the at least one combination including the frequencies which are defined $f_{2n-1}$ and $f_{2n}$ with $f_{2n-1} < f_{2n}$, which are defined such that, if the input impedances of the resonant system at the time of supply of power of the frequencies $f_{2n-1}$ and $f_{2n}$ to the resonant system are represented by $Z_{2n-1}$ and $Z_{2n}$, equal input impedances of the resonant system satisfy $Z_{2n-1} = Z_{2n}$, where n is a natural number, the output frequencies $f_o$ of the power source section is set to lie within the frequency range between the two frequencies to satisfy $f_{2n-1} \leq f_o \leq f_{2n}$, and the load includes a rectifier and a battery, wherein real parts of the input impedances $Z_{2n-1}$ and $Z_{2n}$ represented by $R_{2n-1}$ and $R_{2n}$, and imaginary parts of the input impedances $Z_{2n-1}$ and $Z_{2n}$ are represented by $X_{2n-1}$ and $X_{2n}$, and when the condition $Z_{2n-1}=Z_{2n}$ is met, the real parts and the imaginary parts are set as follows:

$R_{2n-1}=R_{2n}$ and $X_{2n-1}=X_{2n}\neq 0$.

2. The resonance-type non-contact power supply system according to claim 1, wherein at least one of the power supply equipment and the power receiving equipment is provided with an induction coil configured to supply power received from the power source section to the primary resonance coil by electromagnetic induction or with an induction coil configured to draw power received at the secondary resonance coil by electromagnetic induction, and at least the induction coil, the primary resonance coil, the secondary resonance coil, and the load constitute the resonant system.

3. The resonance-type non-contact power supply system according to claim 2, wherein the induction coil is provided in each of the power supply equipment and the power receiving equipment.

4. The resonance-type non-contact power supply system according to claim 1, wherein the power supply equipment includes a matching device for matching the input impedance of the resonant system with the impedance on the power source section side as viewed from the input end of the resonant system and a matching device control section for adjusting the matching device.

* * * * *